Figure 1:
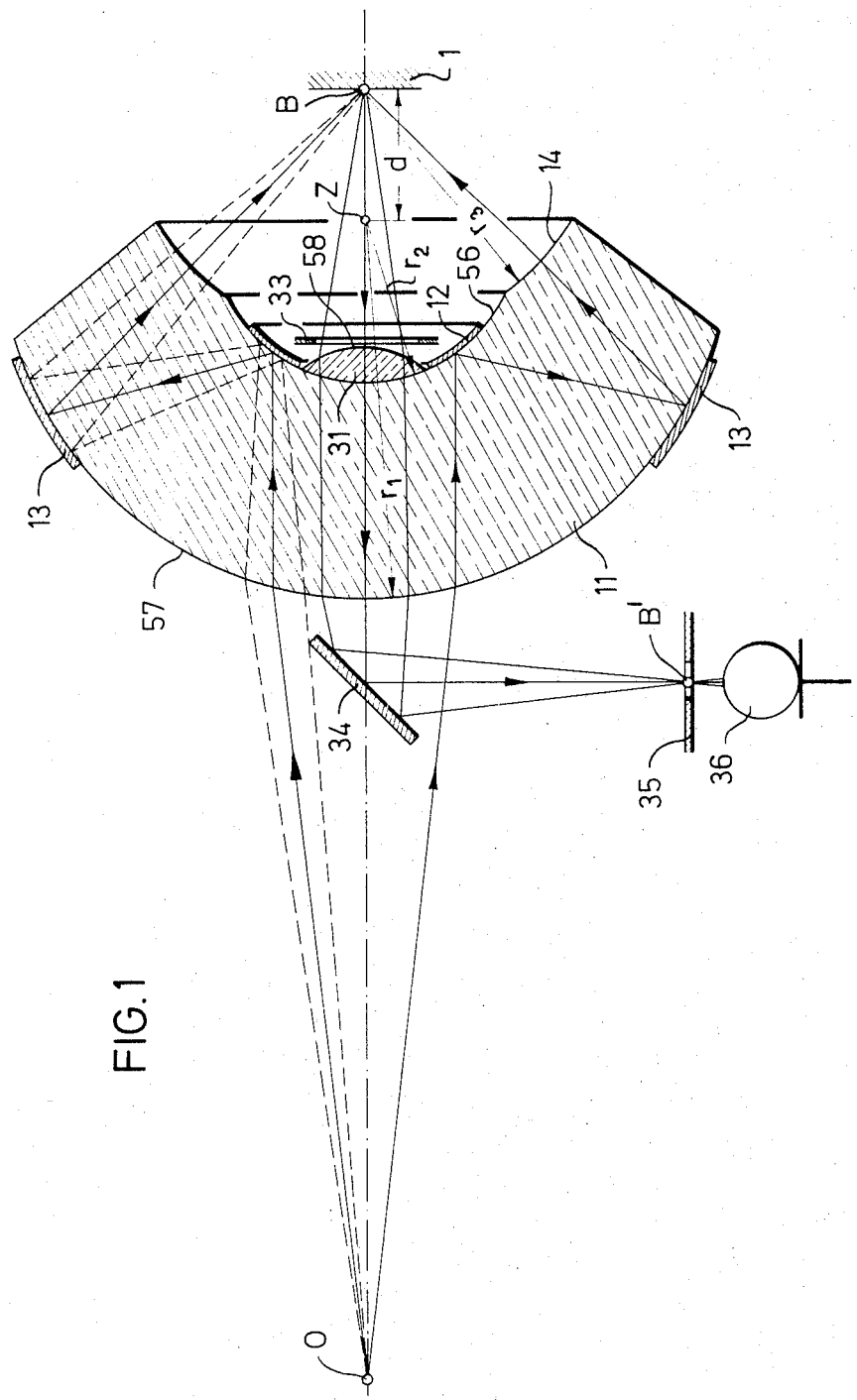

United States Patent [19]
Mast

[11] 3,825,322
[45] July 23, 1974

[54] ILLUMINATION SYSTEM

[75] Inventor: Fred Mast, Wil, Saint Gall, Switzerland

[73] Assignee: Gretag Altiengesellschaft, Regensdorf, Switzerland

[22] Filed: Dec. 29, 1972

[21] Appl. No.: 319,169

[30] Foreign Application Priority Data
Dec. 31, 1971  Switzerland.................. 19246/71

[52] U.S. Cl................ 350/236, 350/201, 350/294, 350/299
[51] Int. Cl. ......................................... G02b 27/02
[58] Field of Search.................... 350/201, 235–238, 350/293, 294, 299

[56] References Cited
UNITED STATES PATENTS

| | | | |
|---|---|---|---|
| 1,724,527 | 8/1929 | Spierer | 350/236 |
| 1,853,689 | 4/1932 | Lihotzky | 350/236 |
| 2,656,761 | 10/1953 | Blaisse | 350/201 |
| 2,746,348 | 5/1956 | Leitz | 350/235 |
| 3,547,525 | 12/1970 | Rayces | 350/201 |

*Primary Examiner*—Ronald L. Wibert
*Assistant Examiner*—Michael J. Tokar
*Attorney, Agent, or Firm*—Pierce, Scheffler & Parker

[57] ABSTRACT

An optical system is provided which in conjunction with a light source is used to illuminate an object whose reflective properties are required to be measured. The optical system comprises a condenser lens having first and second spherical surfaces, the first having an annular reflective surface on its periphery and the second an annular reflective surface at its central portion. A positive lens is mounted in the aperture of the reflective annular surface on the second surface of the condenser lens which has a third spherical surface surrounding the second surface. The center of curvature of the third surface defines the position of the object which is illuminated by light entering the first surface, being reflected from the reflective surface on the second surface back through the condenser, reflected from the reflective surface on the first surface back through the condenser lens to exit from the third surface to be focussed on the object. Light reflected by the object is focussed by the positive lens through the condenser on to a light measuring system.

7 Claims, 4 Drawing Figures

ILLUMINATION SYSTEM

The invention relates to a system for the incident-light illumination of objects with a glass member forming a reflector condenser and having a surface that faces away from the object and functions as entry surface for the illumination rays and having two spherical annular reflectors which are concave relative to the object, the annular reflector disposed inwardly in the direction of the optical axis of the system being adjoined in the radially outward orientation by a like spherical surface which functions as exit surface for the illumination rays, the centre of curvature of the exit surface for the illumination rays being disposed in the object plane and having a positive lens in one-sided optical contact with that surface of the glass member which is nearest to the object.

In a known system of this kind, which is used for illuminating an opaque object to be observed through a microscope, the entry surface for the illumination rays is plane and is provided on a ground-in portion with a lens which forms a microscope objective together with the glass member and the positive lens which is applied to the other surface of the glass member.

It is clear that this system is relatively complicated and expensive more particularly because of the need for providing the entry surface for the illumination rays with a ground-in portion and for the provision of a lens in said ground-in portion. Furthermore, it is doubtful whether this system may be sufficiently corrected with regard to the central aperture aberration.

The purpose of the invention is to provide a universally usable illumination system of the kind mentioned hereinbefore and which is particularly suitable for use in measuring heads intended to define the reflectivity properties of surfaces. To this end it is necessary that the light supplied by the illumination system illuminates the surface under inspection as uniformly as possible over a defined zone. It should also be possible to manufacture the illumination system simply and it should not require any adjustment in operation.

This aim is achieved in accordance with the invention and while avoiding the disadvantages of the known illumination system by virtue of the fact that the glass member which functions as a condenser lens includes first and second spherical surfaces which are concentrical one to the other and a third spherical surface surrounding the second spherical surface and having a radius of curvature greater than that of the second spherical surface so that the centre of curvature of the third spherical surface lays in a plane at which an object is to be placed for illumination by light incident on the first spherical surface. A first annular spherical reflecting surface faces the peripheral portion of the first spherical surface so that the axis of that reflecting surface is coincident with the axis of the condenser lens and a second annular spherical reflecting surface faces the central portion of the second spherical surface so that the axis of the second reflecting surface is also coincident with the axis of the condenser lens. The positions of the two reflecting surfaces which are concentrically disposed are such that light entering the first reflecting surface travels through the condenser lens, is reflected by the second reflecting surface back through the condenser lens so as to impinge upon the first reflecting surface which then reflects the light back through the condenser lens to exit through the third spherical surface and be focussed at its centre of curvature. Also included is a positive lens which has one surface facing the second spherical surface to focus light through the aperture in the second reflector surface and which is so mounted that the axis of the positive lens is coincident with the axis of the condenser lens. Moreover, the refractive index of the condenser lens and the radii of curvature of the first, second and third spherical surfaces are chosen such as to render the optical system aplanatic, i.e., free from spherical aberration.

If the optical path is reversed the illumination system described hereinabove may be used as a positive optical system for the light transmitted by a light source by slight modifications, i.e., by replacing the positive lens and the annular reflector surrounding same with a convex reflector. In this case the object is replaced by the light source of which the positive optical system produces an image in a defined plane. If the image of the light source is produced in the opening of a diaphragm it is possible for undesirable optical properties of the light source bulb, for example edge distortion and the like, to be eliminated by suitable selection of the aforementioned diaphragm.

It has been found particularly advantageous to dispose the positive optical system described hereinabove upstream of the illumination system according to the invention when this is used in measuring heads to measure the reflectivity properties of surfaces because it is thus possible to eliminate stray light from the system as well as adjust the dimensions of the light spot which is projected on to the surface to be measured.

Figure 2:
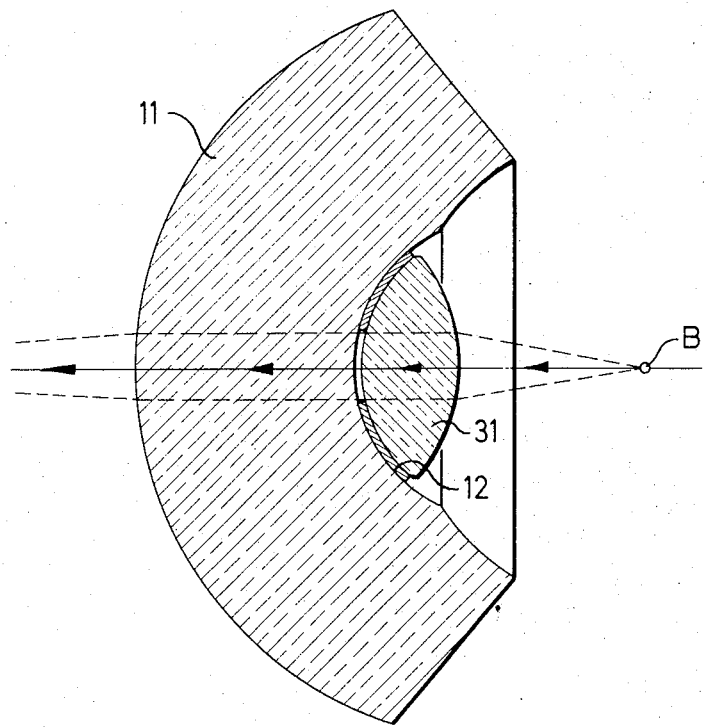
Figure 3:
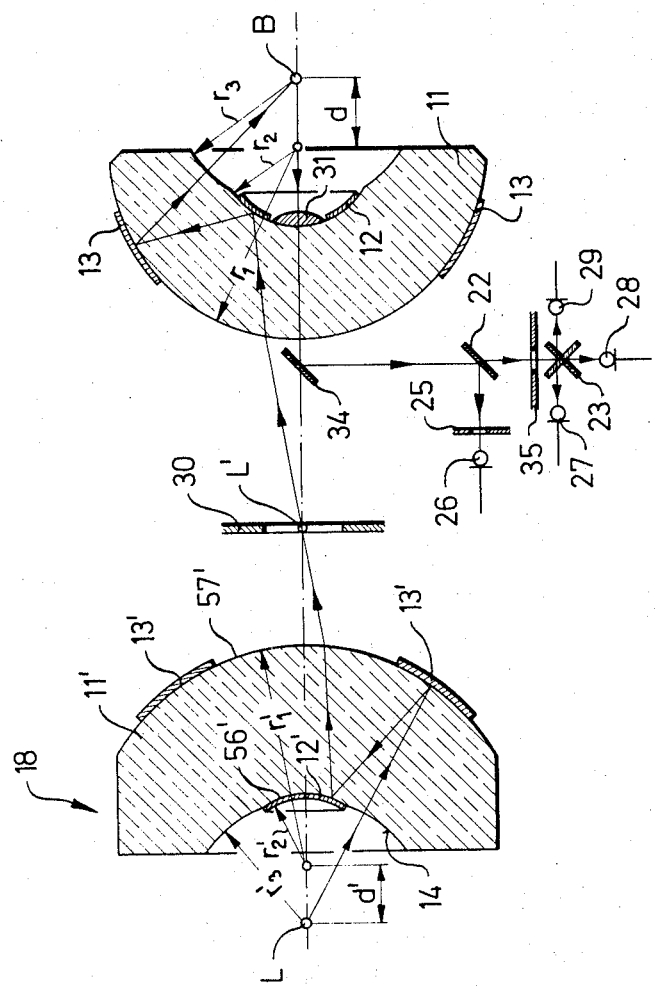
Figure 4:
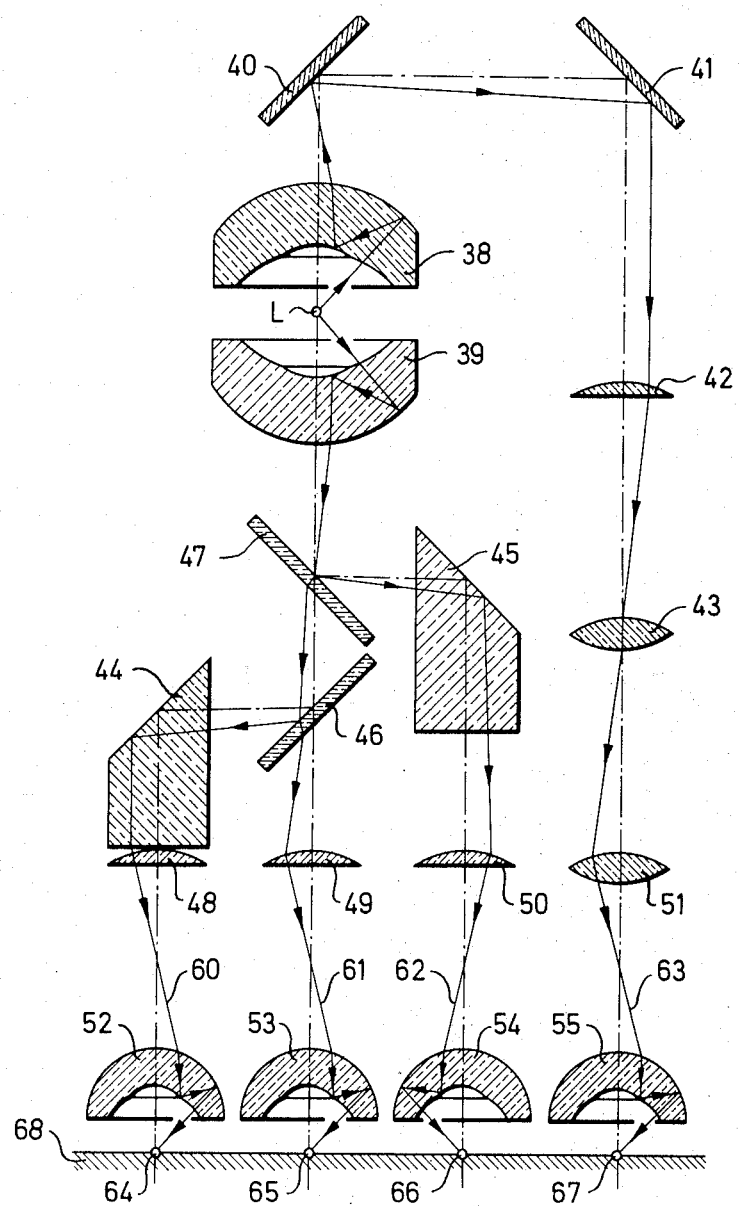

Embodiments of the invention will now be explained by reference to the accompanying drawings in which FIG. 1 is a diagrammatic view of a first embodiment of an illumination system according to the invention, FIG. 2 is a detail modification of the system of FIG. 1, FIG. 3 is a diagrammatic view of a simplex measuring head for measuring the reflectivity properties of surfaces with an illumination system according to FIG. 1, and FIG. 4 is a diagrammatic view of a multiplex measuring head for measuring the reflectivity properties of surfaces with several illumination systems of the type according to FIG. 1.

According to FIG. 1, part of the light emitted by a light source O is condensed in a glass member 11 and projected on to the surface of a specimen 1 whose reflectivity properties are to be measured. The measuring spot B which is illuminated on the surface of the specimen has a surface area of some $mm^2$. The light reflected by the measuring spot passes through the glass member 11 and is projected by a reflector 34 on to a photo detector 36.

The glass member 11 has two spherical surfaces 56 and 57 which are concave with respect to the measuring spot B. A spherical annular reflector 12 is disposed on the inner spherical surface 56 and another spherical annular reflector 13 is disposed on the outer spherical surface 57. The inner spherical surface 56 is also provided with a positive lens 31 which is coaxial with the glass member 11 and is disposed within the first annular reflector 12.

In the outward radial direction the inner spherical surface 56 is adjoined by a third spherical surface 14. The outer spherical surface 57 with the curvature radius $r_1$ and the inner spherical surface 56 with the curvature radius $r_2$ have a common centre Z and are therefore concentric.

The centre of the curvature of the third spherical surface 14 with the curvature radius $r_3$ coincides with the measuring spot B. The curvature centre Z of the outer and inner spherical surfaces is disposed at a distance $d$ in front of the measuring spot B.

The light emitted by the light source O passes through the outer spherical surface 57 of the glass member 11 on to the annular reflector 12 by which it is reflected to the other annular reflector 13. The other annular reflector 13 reflects the light through the third spherical surface 14 of the glass member 11 on to the measuring spot B. The light reflected by the measuring spot B is condensed by the lens 31, passes through the glass member 11 and is deflected by the reflector 34 through the aperture of a diaphragm 35 on to the photo detector 36, an image 36, an image B' of the measuring spot B being produced in the aperture of the diaphragm 35. The cross-section of the stopped down light beam which is reflected by the measuring spot B may be varied by the size of the diaphragm aperture.

The positive lens 31, which bears on one side of the glass member 11, is preferably constructed of the same material as that used for the glass member 11. The measuring spot B is therefore displayed in the aperture of the diaphragm 35 by an optical condenser system comprising a thick lens. The said thick lens is defined by boundary surfaces comprising the outer spherical surface 57 of the glass member 11 and the surface 58 of the lens 31 which is nearest to the measuring spot B. A diaphragm 33 may be disposed between the measuring spot B ad the positive lens 31 to limit the aperture angle of the light reflected by the measuring spot B.

The illumination system illustrated in the drawing corresponds to the US-Standard PH2.17-1958 for measuring the reflectivity properties of surfaces. This US-Standard specifies that the surface to be measured must be illuminated with a light beam inclined at an angle of 45° relative to the surface to be measured and having an aperture angle of 10°. A light beam with an emergent angle of 90° and an aperture angle of 10° must be stopped out and made to converge from the light reflected from the surface which is to be measured. Illumination for all azimuth angles must be applied over the same angular range of 45° ± 5° and must therefore constitute a 360° ring illumination.

Despite the very large angle of inclination of 45° between the surface to be measured and the incident light beam the advantageous geometry of the system enables it to be corrected by suitable choice of the curvature radii $r_1$, $r_2$ and $r_3$ and of the refractive index of the glass member 11 so that the central spherical aberration of the system is equal to zero and the sine condition is ideally satisfied. The optical system is thus aplanatic. Furthermore, if the measuring spot B is sufficiently small, it is possible for chromatic abberations and distortion of the system to be confined within very narrow limits.

According to FIG. 2 the annular reflector 12 may be vacuum-deposited on the lens 31 instead of being deposited on the glass member 11 and its size may be selected so that it also performs the function of the diaphragm 33 (FIG. 1) for the convergent optical system.

According to FIG. 3, the illumination system illustrated in FIG. 1 is preceded by a condenser system 18 when used in a simplex measuring head for measuring the reflectivity properties of surfaces, the condenser system producing an intermediate image L' of the light source L in the aperture of a diaphragm 30. Undesirable optical properties of the quartz bulb of the light source L may thus be eliminated together with stray light of the system and the dimensions of the measuring spot B may also be influenced. The condenser system 18 corresponds substantially to the illumination system illustrated in FIG. 1 with a reversed optical path, that is to say the measuring spot B of FIG. 1 is replaced by the light source L and the light source O of FIG. 1 is replaced by the intermediate image L' of the light source L in the aperture of the diaphragm 30. Furthermore, the positive lens 31 (FIG. 1) is omitted from the condenser system 18 and the annular reflector 12 (FIG. 1) is replaced by a convex reflector 12'. The curvature radius of the inner spherical surface 56 of the glass member 11' of the condenser system 18 which supports the convex reflector 12' is designated as $r_2'$, the curvature radius of the outer spherical surface 57' which supports the annular reflector 13' is designated with $r_1'$, the curvature radius of the third spherical surface 14' is designated with $r_3'$ and the distance between the curvature centres of the outer and inner spherical surface and the curvature centre of the third spherical surface is designated with $d'$. The light source L is disposed in the curvature centre of the third spherical surface.

The light beam transmitted by the light source L passes through the third spherical surface 14' of the glass member 11' on to the annular reflector 13' and is reflected thereby to the convex reflector 12'. The beam is deflected by the aforementioned reflector through the glass member 11' on to the aperture of the diaphragm 30. In the actual illumination system the optical path is as in the embodiment illustrated in FIG. 1. The cone of rays reflected by the measuring spot B, converged and deflected by the reflector 34 is divided into two parts by means of a semi-transparent reflector 22, one part being deflected into the aperture of the diaphragm 35 and the other part being deflected into the aperture of a diaphragm 25. An image of the measuring spot B is thus produced in both diaphragm apertures. It is thus basically possible to process the signal supplied by the measuring spot B in two different ways. For example, if the aperture of the diaphragm 25 is smaller than the image of the measuring spot B produced in said aperture, it is possible for details within the measuring spot B to be measured by means of a photo detector 26 disposed downstream of the diaphragm 25. The partial cone of rays which is deflected on to the aperture of the diaphragm 35 may be chromatically analysed by means of a dichroic system 23 and two photo detectors 27, 28 and 29. A combination of these two facilities is utilised for example for chromatic measurements on intaglio printing machines in operation in which the measured object is a standardised scale of colour zones (large zones, evaluation with photo detectors 27, 28 and 29) and synchronisation zones (small zones, evaluation with the photo detector 26).

The principal data relating to the dimensions of the measuring head illustrated in FIG. 3 are as follows:
Illumination part
a. optical condenser system 18

$r_1' = 38$ mm; $r_2' = 12$ mm; $r_3' = 21.5$ mm; $d' = 10$ mm; glass member 11' : Schott BK7 b. Optical image-forming system $r_1 = 32.5$ mm; $r_2 = 13.5$ mm; $r_3 = 21.5$ mm; $d = 11.5$ mm, glass member 11: Schott BK7 c. lamp L: halogen 50 W, 2,340 Sb, light flux: 1,400 Lumen, size of light spot: 3.3 × 1.5 mm image scale of lamp L — measuring spot B = 1.4 : 1 size of measuring spot B : 2.4 × 1.1 mm optical path on the illumination side: 45° ± 5°/360° — ring type numerical aperture of the system: 0.41 illumination intensity at the measuring spot approx. $10^7$ Lux light flux at the measuring spot B: approx. 30 Lumen Converging part a. optical path of the converging system: 90° ± 5° b. image scale of the measuring spot B on the diaphragms 35 and 25: approx. 1 : 3 c. numerical aperture of the positive optical lens system: 0.087 d. converged light flux if the amount of light incident on the measuring spot B is 30 Lumen: approx. 250 m Lumen.

According to FIG. 4 which relates to a multiplex measuring head for monitoring the colour of offset printing machines and using the illumination system illustrated in FIGS. 1 or 3 respectively, four ray cones 60, 61, 62 and 63 are derived from a light source L, each of said cones biasing illumination systems 52, 53, 54 and 55. Each of the said illumination systems corresponds to the illumination illustrated in FIG. 1. The light source L is surrounded by two condensers 38 and 39 which correspond to the condenser system 18 illustrated in FIG. 3. A separate light beam is supplied to the two condensers 38 and 39. The condenser 38, from which the light beam 63 is derived, is followed by two reflectors 40 and 41, three field lenses 42, 43 and 51 and the illumination system 55. The illumination system 55 acts on the object 68 with the measuring spot 67. The optical path of the light reflected by the measuring spot and extending by analogy with FIG. 1 is not shown in the drawing. The condenser 39, from which the light beams 60, 61 and 62 are derived, is followed by two beam splitters 46 and 47, two optical prismatic compensating elements 44 and 45, three field lenses 48, 49 and 50 and the illumination systems 52, 53 and 54. The measuring spot 64 is applied to the object 68 by the illumination system 52, the measuring spot 65 is applied to the object by the illumination system 53 and the measuring spot 66 is applied to the object by the illumination system 54. The optical path of the light reflected by each measuring spot extends by analogy to FIGS. 1 or 3 but is not shown. If the beam splitters 46 and 47 are dichroitic chromatic splitters, it is possible to obtain a chromatic analysis of the object 68 with respect to the primary colours red, green and blue on the basis of the light reflected by the measuring spots. In this case the light reflected by the measuring spot 67 is preferably used for measuring the brightness.

Each of the four illustrated optical channels has a numerical aperture of 0.41; the numerical aperture of the positive optical system not shown (optical path of the light reflected by the measuring spots) in each case amounts to 0.087.

I claim:

1. An optical system comprising:

a. a condenser lens having first and second spherical surfaces which are concentrical one to the other and a third spherical surface surrounding said second spherical surface and having a radius of curvature greater than that of said second spherical surface so that the centre of curvature of said third spherical surface lays in a plane at which an object is to be placed for illumination by light incident on said first spherical surface;

b. a first annular spherical reflecting surface facing the peripheral portion of said first spherical surface so that the axis of said reflecting surface is coincident with the axis of said condenser lens;

c. a second annular spherical reflecting surface facing the central portion of the second surface so that the axis of said second reflecting surface is coincident with the axis of said condenser lens, the positions of the reflecting surfaces being such that light entering said first surface travels through said condenser lens, is reflected by said second reflecting surface back through the condenser lens to impinge on said first reflecting surface which reflects the light back through said condenser lens to exit through said third surface and be focussed at the centre of curvature thereof; and d. a positive lens having one surface facing said second spherical surface to focus light through the aperture in the second annular reflecting surface and mounted so that the axis of said lens is coincident with the axis of said condenser lens, said first and second annular reflecting surfaces being concentrically disposed and the reflective index of the condenser lens and the radii of curvature of said first, second and third surfaces being chosen so that said system is aplanatic.

2. A system according to claim 1 wherein the first and second reflecting surfaces are vapour deposited on the first and second surfaces of the condenser lens respectively.

3. A system according to claim 1 wherein said second reflecting surface is deposited on that surface of said positive lens facing the second spherical surface of said condenser lens.

4. A system according to claim 3 wherein the aperture in said second annular reflecing surface forms a stop for the lens system comprising the positive lens and said condenser lens.

5. An optical system according to claim 1 in combination with a condenser system comprising:

a. a first lens having first and second spherical surfaces which are parallel one to the other;

b. a first annular spherical reflecting surface on the peripheral portion of said first lens so that the axis of the reflecting surface is coaxial with the axis thereof; and c. a second spherical reflecting surface on the central portion of the second surface of said first lens so that the axis of the second reflecting surface is coaxial with the axis thereof;

means mounting the condenser system so its optical axis is coaxial with that of said condenser lens and the first surface of the latter is convex with respect to the first surface of the first lens;

a stop between said condenser lens and said first lens;

a light source on said optical axis and facing said second spherical surface of the first lens which is concave with respect to said source;

a reflective surface between said stop and the first surface of said condenser lens; and means for analysing light reflected from an object placed at the centre of curvature of the third surface of said condenser lens and passed through said positive lens and reflected by said reflective surface.

6. The combination according to claim 5 wherein said analysing means includes filters to split up the light reflected by said object into different colours and a plurality of photosensitive means each responsive to a different one of said colours to provide an output signal.

7. A measuring head comprising a plurality of optical systems according to claim 1, a light source and means for imaging said source onto the first surfaces of each of the condenser lenses of said plurality of optical systems.

* * * * *